Feb. 7, 1956 L. W. MURPHY 2,733,477
APPARATUS FOR FACILITATING SLAUGHTERING OF DOMESTIC ANIMALS
Filed Sept. 29, 1952 4 Sheets-Sheet 1
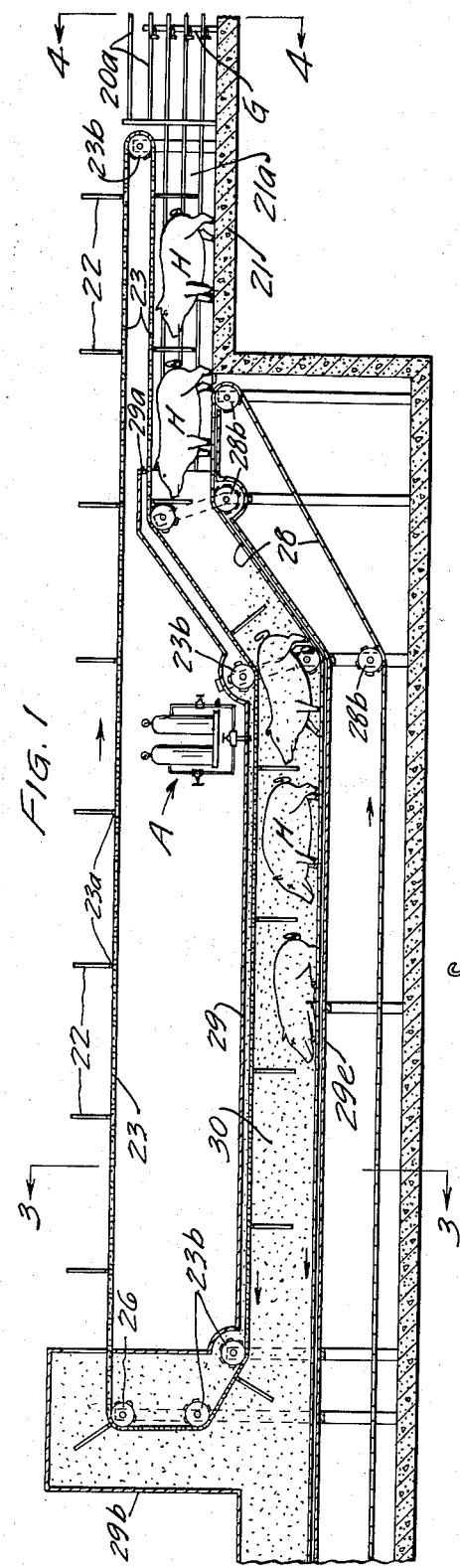
INVENTOR
LAURENCE W. MURPHY
BY Williamson, Williamson, Schroeder & Adams
ATTORNEYS

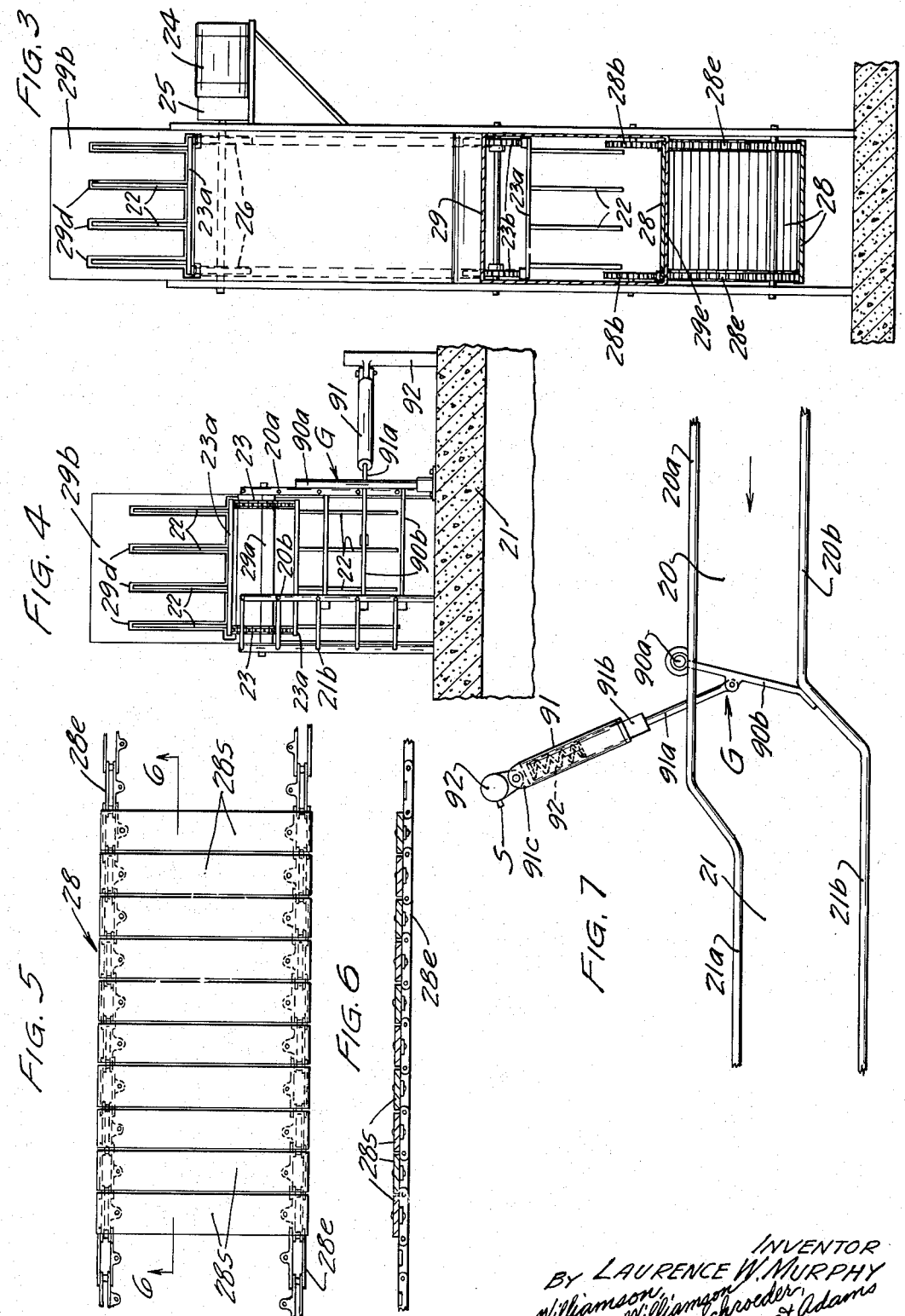

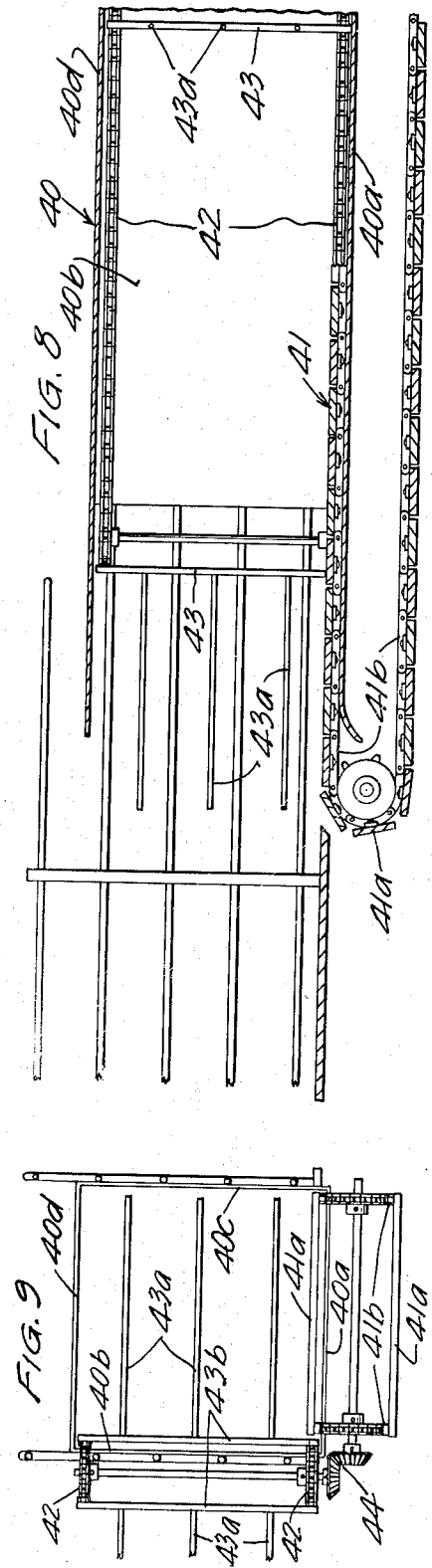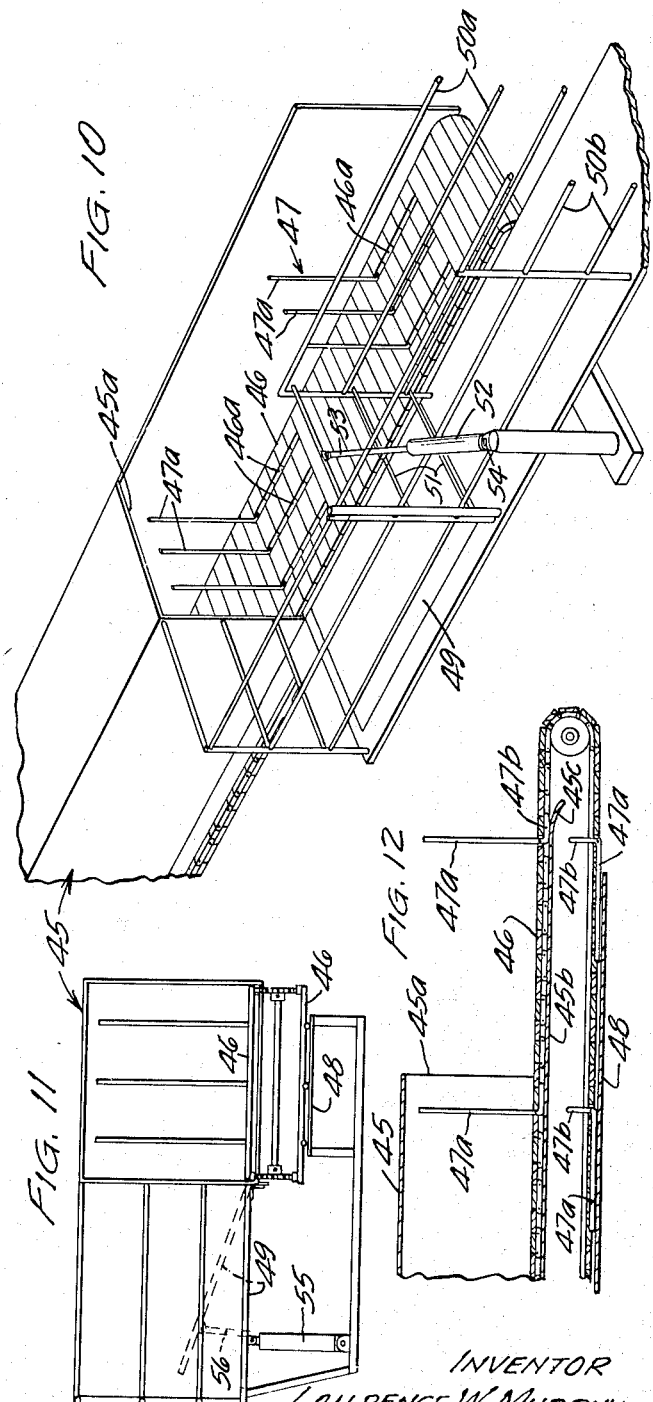

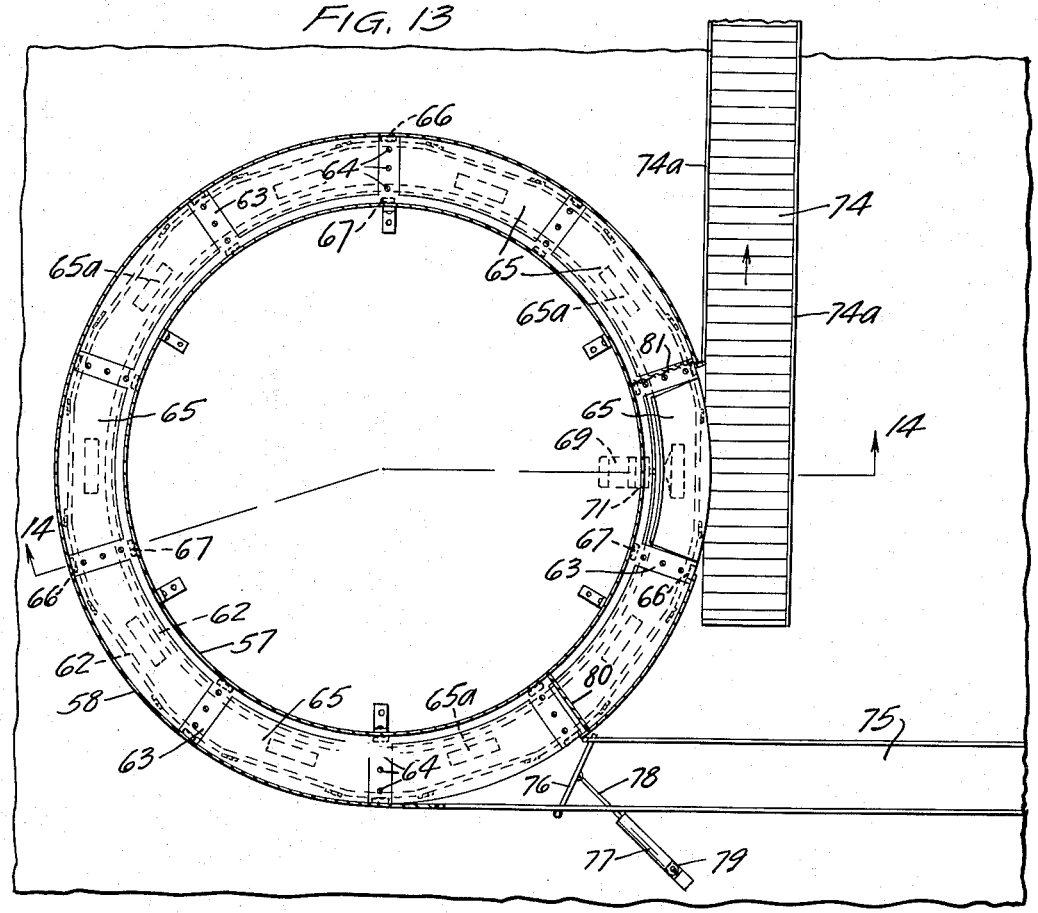
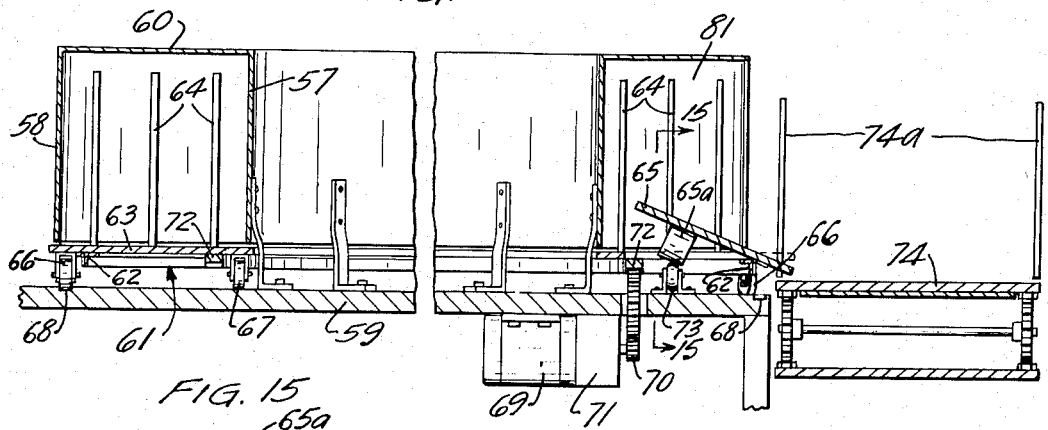
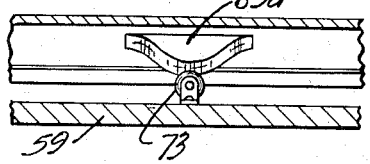

United States Patent Office 2,733,477
Patented Feb. 7, 1956

2,733,477

APPARATUS FOR FACILITATING SLAUGHTERING OF DOMESTIC ANIMALS

Laurence W. Murphy, Austin, Minn., assignor to Geo. A. Hormel & Co., Austin, Minn., a corporation of Delaware Application September 29, 1952, Serial No. 312,094

4 Claims. (Cl. 17—1)

This invention relates to processes and apparatus for facilitating the slaughtering and subsequent processing of domestic animals such as hogs; and for effecting substantial economies as well as producing the best meat cuts with maximum recovery of blood and minimum injury to flesh, hide and bristles.

In my Patent No. 2,526,037, a valuable process and apparatus are disclosed for continuously immobilizing and delivering slaughter animals such as hogs, steers and others, prior to the sticking operation. The animals are conveyed or otherwise moved in a substantially, continuous file between side walls or rails to prevent them from turning and they pass through an anesthetizing chamber in such travel wherein carbon dioxide or other satisfactory gas is administered under uniform control, to an extent to immobilize the voluntary processes of the animals without affecting the involuntary processes such as breathing and circulation of blood stream.

The advantages of such a process are substantial and numerous as pointed out in said Patent No. 2,526,037 serving to eliminate the dirty, dangerous and disagreeable task performed by shackling crews, working in pens; serving further to prevent tightening of the muscles of the animals during their former frantic travel, head down, along the elevator and conveyor, and thereby producing fuller and faster bleeding of the animals without splattering of blood on other animals or upon the equipment utilized. In addition, bruising of the flesh, prevalent in former methods, is materially reduced and with full bleeding, hams and other cuts of the finest quality are obtained.

The present invention represents valuable and further development of my original process to the end that a more uniform and continuous file or stream of animals is assured with employment of a minimum number of prodders and whereby such animals just prior to entrance and travel through the anesthetizing chamber and throughout travel therein, are physically spaced apart and separated to positively prevent stampeding, crowding or piling up of the animals in their file or lane preparatory to and during anesthetizing and shackling.

To such ends, it is an object of my present invention to provide an economical and highly efficient process and apparatus, particularly adapted for the process of my said patent, but also readily adapted for preparatory shackling operations where anesthetizing is not employed to controllably admit animals into the processing file or lane while simultaneously isolating or spacing apart such animals in the lane, through the continuous interpositioning of transverse barriers in the lane and travel, thereby maintaining the animals in a predetermined spaced or isolated relationship.

A further object is the provision of process and apparatus of the class described which is added in a combinative relationship with my previous invention to produce an over-all, higher efficiency and speed capacity therein.

These and other objects and advantages of my invention wil more fully appear from the following description made in conjunction with the accompanying drawings, wherein there is disclosed in somewhat diagrammatical maner, several forms of apparatus embodying the invention and employed for carrying out the processes of my invention, and in which:

Fig. 1 is a view, principally in vertical section through the entering and anesthetizing chamber portions of my preferred apparatus, the tunnel being broken away at the forward or delivery and at the shackling portions thereof;

Fig. 2 is a similar view showing the delivery, shackling and sticking-operation portions of my preferred apparatus;

Fig. 3 is a vertical cross section taken on the line 3—3 of Fig. 1, looking in the direction of the arrows;

Fig. 4 is a rear view or cross section, looking forwardly from just behind the admittance gate at the entering end of my apparatus;

Fig. 5 is a detail plan view illustrating a form of endless, deck-type, animal-conveyor which is suitable for my apparatus;

Fig. 6 is a cross section taken longitudinally on the line 6—6 of Fig. 5;

Fig. 7 is a detail plan view taken from above the instantly controllable admittance gate and associated, railed runway or lane structures;

Fig. 8 is a view, principally in vertical section through the entering tunnel portion of another form of my apparatus showing the barrier-interposing conveyor cooperating with the entrance runway;

Fig. 9 is a rear end elevation of the same;

Fig. 10 is a perspective view showing a third form of my apparatus wherein the barrier bars are interposed from below in a different manner and wherein the animals after individual admittance from the preparatory lane, are dumped upon the deck-conveyor which moves them through the tunnel;

Fig. 11 is an end elevation of the apparatus of Fig. 10;

Fig. 12 is a vertical section taken through the apparatus of Fig. 10, showing the manner in which the barrier elements are cammed into upright position for operation;

Fig. 13 is a plan view of still another form of my apparatus wherein the endless deck-conveyor is in the form of a turn-table and dumps the individual animals after anesthetization upon a moving shackling conveyor;

Fig. 14 is a cross section taken on the line 14—14 of Fig. 13; and

Fig. 15 is a detail sectional view showing the camming actuation of the individual hog-supporting platforms in operation to dump the same onto the shackling conveyor.

In Figs. 1 through 7 of the drawings, a preferred form of my apparatus is illustrated. Here, the live animals such as hogs, are driven by prodders along a narrow runway or lane 20, formed by as shown, two parallel series of post-supported rails 20a and 20b respectively, said two series being spaced close enough (a distance approximating 30 inches has been found satisfactory), to prevent the animals turning in travel. Runway 20 delivers or is communicable with a rather short conveyor-entering, horizontal platform 21 having substantially a continuation of runway 20 defined thereon by the two series of spaced, parallel, post-supported rails 21a and 21b. The animals, under their own power, step from the forward end of platform 21 upon the rear or receiving end of an endless (shown as slat-type) deck conveyor 28 which will later be described in some detail.

Individual admission of the animals from the original runway or lane 20 to the conveyor-entering platform 21 is preferably operator-controlled by a suitable, fast operation gate G, as shown being hinged at one side of runway 20 and swinging forwardly into the entrance portion of platform 21. A suitable form of gate construction will later be described in more detail.

Simultaneously with the advance of the individual animals on platform 21, separation barriers 22 are automatically interposed in the conveyor-entering lane defined by the two series of rails 21a and 21b, as shown, said barriers being positioned respectively ahead of and behind the individual animals and serving also to urge said animals in forward travel and to positively prevent stampeding or collecting of said animals in their entrance upon the deck-conveyor 28 as well as throughout their travel in the anesthetizing chamber 30.

In this form of the invention, these separation barriers 22 are mounted on an overhead, chain conveyor 23 and consist in a plurality of rigid, spaced bar or rod members disposed in depending position and fixed to rigid cross slats 23a of said chain conveyor 23, as best shown in Figures 1 and 3. Any suitable means for driving the chain conveyor 23 is provided, such as the motor 24 driving sprocket wheels 26 through a gear box 25. The two endless chains of conveyor 23 are trained about two series of idler sprockets 23b properly positioned to cause the underleaf of conveyor 23 to extend parallel with the declined portion of animal conveyor 28 and the lower horizontal portion thereof. The lower ends of the rods of the barriers 22 are of course disposed in closely spaced relation to the surface of the platform 21 and the hogs or other animals as indicated by the letter H, are caused to move forwardly therewith. The closely spaced upstanding side walls 21a and 21b formed by vertically spaced rail members, as shown in Fig. 1, prevent the hogs from turning around while being urged onto an endless deck-conveyor 28. The animals on deck-conveyor 28, are carried into the inlet end of an elongated housing or tunnel 29 forming an immobilizing on anesthetizing chamber 30 therein. The inlet end 29a of the housing slopes downwardly to form a depressed housing portion disposed below the inlet end thereof and it is this depressed portion that forms the immobilizing chamber 30. The housing 29 consists in a substantially sealed, gas-confining hollow member or tunnel which is continuous from one end to the other.

Suitable controlled anesthetizing apparatus A is mounted as shown on the top of housing 29 with adjustable pressure-regulated valves and conventional equipment for controlling discharge of suitable gas such as carbon dioxide within the immobilizing chamber 30. The upper run of deck-conveyor 28 is movably mounted and slides along the bottom 29e of said housing and suitable idler sprockets 28b guide said conveyor. The chain conveyor 23 is suitably guided as shown in Figs. 1 through 7 inclusive, by said sprockets 23b in close association with the top of the housing and, in the form shown, said chain conveyor 23 with the depending barriers 22 fixed thereto travels only a portion of the length of the housing and confines and isolates the animals only for the period during which they become immobilized by the anesthetizing gas.

As best shown in Fig. 1, an intermediate portion of the housing 29 has a raised section 29b through which the chain conveyor 23 is guided by suitable guiding sprockets 23a and in the form shown, driving guiding sprockets 26 are disposed in the upper portion of said raised housing portion 29b. As best shown in Figs. 3 and 4, the panel of the raised housing portion 29b through which the return of the chain conveyor 23 passes has bar-receiving slots 29d formed therein through which the bars or rods of the barriers 22 (which are then disposed in upstanding position) are free to pass, but through which little of the anesthetizing gas escapes.

The central depressed portion of the tunnel or housing 29 confines the anesthetizing gas which is preferably heavier than air, such as carbon dioxide, and the hogs, after being rendered unconscious, are carried out of the chamber 30 by the deck-conveyor 28. The housing or tunnel 29 has an upwardly sloping outlet portion at the discharge end of the immobilizing chamber provided with a flexible, gas-confining partition or curtain 31, hingedly mounted at the top of said housing to prevent substantial portions of the gas from being carried out of the chamber. The deck-conveyor 28 is guided upwardly along the inclined bottom at the discharge end of the housing 29 and carries the hogs out through the outlet end 29c of said housing. Said deck-conveyor then passes horizontally outwardly to form a horizontal, moving platform area 28a from which the hogs may be easily shackled and thereafter suspended for the sticking operation from a conventional overhead hook-conveyor 23 in conventional manner.

A stationary supporting platform 32 is provided alongside the horizontal portion of conveyor platform 28 to permit an operator to attach the supporting shackle to one of the anesthetized hog's hind legs and to fasten the shackle chain to one of the hooks 33a supported from the overhead channel 34. The unconscious hogs, whose voluntary actions have been completely immobilized then hang, head down, over the sticker's platform 35 where the carotid artery is cut and the blood flows down onto the bleeding slab 36 and into the collection sump 37 from which said blood is carried for subsequent processing by a suitable outlet conduit 38.

The power take-off of a motor 39, best shown in Fig. 2, which drives the animal conveyor deck 28 and the drive from motor 24, which drives the endless chain conveyor 23, are synchronized to travel at the same speed so that when the hog becomes unconscious while still confined between a pair of barriers 22 there will be no variation in the relative position of the hog and said barriers.

Close cooperation is required between the travel of the barrier-conveyor 23 and the fast operation of gate G, controlling individual admission to the conveyor-entering platform 21. Gate G may be automatically opened and closed in synchronized relation to the travel of the barrier conveyor in which instance prodder operators must closely watch the travel of the animals in file up and to the gate. I prefer, however, to provide a quick action electrically or pneumatically controlled gate, as shown, hinged to a post 90a and carrying a series of rigid, vertically spaced, horizontal gate bars 90b. A plunger rod 91a, as shown, is pivotally connected at its outer end with the medial portion of one of the gate bars 90b and has a piston or solenoid armature 91b, which is slidably mounted within, as shown, an electromagnetic coil 91, said coil being suitably housed and having a strap 91c at the inner end thereof which is pivoted to a post 92. A coil spring 93 is interposed between plunger 91b and the inner end of the cylinder defined by the coil and is compressed upon inward movement of the piston or plunger to provide tension for subsequently shutting the gate. As shown, a push button control switch S is mounted on the post 92 to enable an operator to instantly actuate gate G. It is of course understood that the form of quick action gate illustrated is merely exemplary.

A suitable type of deck-conveyor for transporting the animals through the tunnel is illustrated in Figs. 5 and 6, consisting as shown, in a pair of endless chains made up of special double links 28L, the inner sides of which are provided with attachment flanges to which the flat slats 28s are bolted or other secured.

With my improved process and apparatus, substantially uniform entrance of the animals onto the travel-conveyor, in spaced, single file relation, is assured, requiring only one operator who may use an electric prodder and who also operates the control switch for the gate.

It will be seen that a continuous, elongated, narrow passage or channel is formed throughout substantially the length of my apparatus by the original narrow runway or lane 20 communicating at its forward end through the fast operation gate G with the narrow passage defined by the rails 21a and 21b in cooperation with the conveyor-entering platform 21 which, in turn, communicates with the declined entrance of the elongated tunnel or housing 29 which, in its intermediate portion, includes the anesthetizing chamber. The said continuous, elongated, narrow passage includes the upwardly inclined or raised section 29b at the delivery end of the apparatus. It will further be seen that platform 21, with the rails 21a and 21b, constitutes a second and short lane forming part of the approach to the slaughtering station.

The travelling barriers 22 are efficiently interposed by the chain conveyor 23 (synchronized with animal conveyor 28) and not only serve to isolate the individual animals in a predetermined, spaced relation but also because of the whip action of the individual barriers 22 at the rear end of chain conveyor 23, urge the animals forwardly and thereafter, by engagement with the butts of the animals, cause them to travel over the entrance platform 21, forwardly and onto the receiving horizontal end of the moving deck-conveyor 28. In fact, with my structure, the animal conveyor may be shortened to a point where animals enter thereon within the lower portion of the tunnel after first breathing some of the anesthetizing gas.

It will readily be seen that throughout their travel, after passing gate G, the individual animals are always spaced apart a predetermined distance between the barriers 22 and cannot stampede or pile upon one another during the operation of my apparatus.

It will further be seen that the barrier-interposing and barrier-moving apparatus in combination with a narrow animal runway and/or tunnel and in further combination with an instantly operable admission gate, provides an apparatus and method which has rather wide applicability to slaughtering methods whether or not the animals during travel, are anesthetized.

Another form of my invention is illustrated in Figs. 8 and 9. In this form of the invention, a housing or tunnel 40 is provided, having a bottom panel 40a, side panels 40b and 40c (best shown in Fig. 9) and top panel 40d, forming a completely closed tunnel open only at the ends thereof. A bottom conveyor platform, designated as an entirety by the numeral 41, having a plurality of transverse slats 41a disposed in parallel side by side relation, is mounted on the bottom panel 40a of the housing or tunnel 40 and the slats 41a are, in the form shown, mounted on endless chains which are trained about suitable guiding and driving sprockets which are supported in a conventional manner by any suitable means. A barrier-interposing chain conveyor 42 is provided around one of the upstanding sides of housing 40, such as around side 40b, and the ends of said conveyor respectively turn on vertically disposed axes positioned somewhat beyond the ends of panel 40b. The upstanding conveyor 42 carries a plurality of barriers 43 having the spaced, horizontally disposed, transversely extending bars 43a connected at one end to an upstanding bar 43b interconnecting the two chains of conveyor 42. The outer free ends of the barrier rods 43a extend substantially the entire distance across the tunnel 40 into close proximity with the side wall 40c opposite wall 40b. The speed at which the two conveyors 41 and 42 are driven is synchronized by the intermeshed bevel gear driving connection 44 between the two conveyor mechanisms, as best shown in Fig. 9.

The barriers 43 of the form of my invention illustrated in Figs. 8 and 9 operate in the same manner as the barriers described in the form of my invention illustrated in Figs. 1 through 7 and the hogs are driven onto the conveyor platform 41 by a suitable control gate mechanism such as has been described for the form of my invention illustrated in Figs. 1 through 7 and the horizontally-disposed barriers 43 serve to separate the hogs until the same have been rendered unconscious by the anesthetizing gas supplied to the anesthetizing chamber formed within the housing 40 by any suitable source of gas supply such as that described in the previously disclosed form of my invention. After being anesthetized, the hogs are of course delivered from the discharge end of the conveyor 41 and are suspended by the shackle hooks and stuck and bled in the manner previously described.

A third form of my invention is illustrated in Figures 10, 11 and 12 wherein a housing or tunnel 45 forms an anesthetizing chamber which is closed except for the two open ends thereof, the end 45a illustrated in Figures 10 and 12, forming the entrance end thereof. A slat-type of conveyor mechanism 46 has its upper run mounted for movement along the bottom panel of housing 45 and travels rearwardly within the tunnel from the open entering end 45a thereof and carries the hogs or other animals through the anesthetizing chamber. A plurality of longitudinally spaced barriers 47 consisting in horizontally spaced rods 47a disposed in upstanding relation when in operative position are carried by said conveyor 46. The rods 47a of each barrier 47 are pivotally mounted relative to said conveyor 46 for swinging movement on a transversely disposed, horizontal axis and each rod has a positioning camming arm 47b fixed thereto below the pivotal connection with the conveyor and extending rearwardly at substantially right angles to the barrier rod 47a when the same is disposed in upright, operative position, as best shown in Figure 12.

The bottom panel 45b forms a camming member for raising the barrier bars 47a into upright, operative position and for holding said bars in said position. In order to provide a compact conveyor mechanism, said rods are pivotally mounted and the normally upstanding portion thereof swings downwardly into horizontal position at the forward discharge end of the conveyor (not shown in the accompanying drawings) and a camming platform 48 is provided for engaging said barrier bars 47a and positively swinging the same into said horizontal position and holding the same therein during the return travel thereof, along the lower run of the conveyor. Each barrier bar has a suitable recess 46a formed in the slats of the conveyor to provide a compact return run and to prevent undue wear on the bar surfaces during said return run. The forward end of the tunnel platform slopes downwardly as at 45c of Fig. 12 in order to gradually raise said bars into upstanding position by engagement with the camming arm 47b.

In this form of my invention, a side delivery platform 49 is provided at the delivery end of a guiding lane formed between the two upstanding side rail sections 50a and 50b through which the animals are driven in single file by a prodder. A control gate 51 separates the delivery lane from the side delivery platform 49 and is adapted for quick operation by any suitable means such as the electric solenoid 52 having a plunger rod 53 and responsive for actuation to a switch control button 54 adapted to be operated by the prodder. The platform 49 is adapted to be swung upwardly on a longitudinally disposed axis positioned in close association with the adjacent edge of conveyor 46 as by any suitable, quickly actuated mechanism such as the solenoid 55 having a plunger rod 56 and synchronized with the gate-actuating plunger rod by being connected with the control button 54. Any suitable means may be provided for establishing the desired time lag between the closing of the gate 51 and the swinging of platform 49 upwardly into animal-discharging position.

Obviously, the gate-actuating mechanism and the platform-dumping mechanism must be synchronized with the position of the barriers 47 and this of course may be done by the prodder himself or the entire mechanism may be automatically actuated by any suitable means, not shown, and responsive solely to the position of the barriers 47. The side panel of the housing 45 opposite the delivery platform 49 is extended forwardly a substantial distance beyond the entering end 45a of the housing in order to guide the hogs into the tunnel. The platform 49 may be held in upright position a sufficient time to permit the hog discharged therefrom to travel into the tunnel at least partially and thus prevent the hog from moving back onto the plaftorm after discharge onto the conveyor 46.

A fourth form of my invention is illustrated in Figs. 13, 14 and 15 and in this form, I provide an annular housing or tunnel having an inner, upstanding side wall 57 and a concentrically disposed, outer upstanding side wall 58 mounted in fixed relation on a suitable stationary platform 59. The two upstanding side wall portions 57 and 58 are interconnected across the top thereof as by an annular top closure panel 60 fixed in sealed relation thereto. The lower edges of the concentric sides 57 and 58 are disposed in upwardly spaced relation above the platform 59 and a movable turn-table is mounted thereunder and is designated as an entirety by the numeral 61. In the form shown, this movable turn-table 61 is constructed from suitable supporting frame members 62 with circumferentially spaced, radially disposed barrier-supporting members fixed therebetween and designated by the numeral 63. Each of these barrier supports 63 carries a plurality of horizontally spaced, upstanding barrier rods 64.

An animal-supporting platform 65 is mounted between the barrier-supporting members 63 and is hinged for swinging movement along a chord of the outer periphery of the turn-table and is normally supported in horizontal position on the two annular frame members 62, the outer frame member 62 supporting the hinges on which platform 65 is mounted. Suitable means for guiding and supporting the turn-table are provided such as the rollers 66 and 67 underlying each of the barrier-supporting members 63 and carried thereby. The outermost rollers 66 are mounted in a recessed, annular guiding track formed thereunder in the platform 59 and guide the circular path of the turn-table 61.

Suitable means for driving the turn-table are provided, such as the motor 69, driving a pinion 70 to a gear box 71. The pinion 70 is meshed with a toothed ring gear mounted in fixed relation to the inner portion of the bottom side of the turn-table and is designated by the numeral 72. Each of the platforms 65 has an underlying, depending, tilting or dumping cam 65a for engagement with a camming roller 73 once during each revolution of the turn-table, the camming roller being mounted for rotation on a fixed axis on said stationary platform 59. The inside wall 57 of the stationary housing is continuous in the form shown, but the outside wall 58 has an opening adjacent the camming roller 73 through which the anesthetized animals are discharged by the tilting of the platform 65 and a conveyor 74 is provided for carrying the unconscious animals to the sticker station (not shown). A delivery lane 75 of conventional design, is provided for guiding the animals in single file relation to the entrance opening formed in the outside wall 58 in closely spaced relation to the delivery opening therein. A control gate 76 is swingably mounted at the delivery end of said lane 75 and is actuated by any suitable means such as the controllable solenoid 77 operating plunger 78 and actuated by push button 79. A partition 80 having slots formed therethrough to permit the passage of the upstanding barrier rods 64 is provided immediately behind the entrance opening to positively prevent any of the animals from moving rearwardly even if the rear barrier has not progressed a sufficient distance around the track.

All of the alternate forms of my invention illustrated in Figs. 8 to 15 inclusive, are provided with suitable gas-supply means (not shown) similar to the supply means illustrated and described for the form of my invention illustrated in Figs. 1 through 7 and of course, the anesthetizing gas is discharged into the housing or tunnel provided in the respective forms of my invention. The partition 80 also serves to confine the anethetizing gas to some degree and in addition thereto, a depending gas-confining member such as the canvas 81, is provided adjacent the discharge end of the tunnel and limits the escape of the gas as the animals are discharged therefrom. Suitable side members 74a are provided along the sides of the conveyor 74 to positively retain the animals thereon.

The operation of all of the alternative forms of my invention in anesthetizing the animals after separating the same and positively maintaining the separation during the entire period of conveying the animals while the same are conscious through the anesthetizing chamber.

From the foregoing description, it will be seen that the processes of all of the several forms of apparatus disclosed including the guiding of animals into a single file formation and interposing in the travel of such animals forwardly, moving barriers between the individual animals to maintain spaced relation of the animals during travel toward a slaughtering station. The process of all forms also include the conveying of the animals in single file barrier-spaced-relation from a predetermined point to a slaughtering station and the process of all forms disclosed also includes in the maintenance of the forwardly moving barriers, the anesthetizing of the animals to obtain major and valuable benefits as set forth in my issued Patent 2,526,037.

It will of course be understood that various changes may be made in the form, details, arrangement and proportions of the different parts of the apparatus and that equivalencies or changes may be made in the steps of the processes described without departure from the scope of the present invention.

It further will be understood that while I prefer to interpose barriers in my process and apparatus between the individual animals, it is thoroughly practical to separate or isolate two or more animals within the confines between two of the barrier elements, all within the scope of my invention.

What I claim is:
1. Apparatus for anesthetizing slaughter animals preparatory to slaughtering comprising means defining an elongate narrow passageway, said passageway having a runway, an entering platform and an anesthetizing section, a quick action gate between said runway and said entering platform, movable separation barriers extending throughout said entering platform and said anesthetizing section, and a deck conveyor in said anesthetizing section.

2. The invention according to claim 1, wherein said barriers are spaced apart a distance slightly greater than the average length of the slaughter animals.

3. The invention according to claim 1, wherein the movement of said barriers is synchronized with the travel of the conveyor to interpose the barriers between the animals and the entering platform and the conveyor.

4. The invention according to claim 1, wherein said barriers are embodied in an endless structure the movement of which is synchronized with the travel of the conveyor to interpose the barriers between the animals and the entering platform and the conveyor.

References Cited in the file of this patent

UNITED STATES PATENTS

| Number | Name | Date |
|---|---|---|
| 712,579 | Nicholson et al. | Nov. 4, 1902 |
| 1,940,005 | McKee et al. | Dec. 19, 1933 |
| 2,092,440 | Cain | Sept. 7, 1937 |
| 2,185,949 | Regensburger | Jan. 2, 1940 |
| 2,358,000 | Cornell | Sept. 12, 1944 |
| 2,526,037 | Murphy | Oct. 17, 1950 |